United States Patent [19]

Yoshimaru

[11] 4,446,492

[45] May 1, 1984

[54] INFORMATION RECORDING SYSTEM

[75] Inventor: Tomohisa Yoshimaru, Yokohamashi, Japan

[73] Assignee: Tokyo Shibaura Denki Kabushiki Kaisha, Kawasaki, Japan

[21] Appl. No.: 464,372

[22] Filed: Feb. 7, 1983

Related U.S. Application Data

[63] Continuation of Ser. No. 203,976, Nov. 4, 1980.

[30] Foreign Application Priority Data

Nov. 6, 1979 [JP] Japan .................................. 54-143720

[51] Int. Cl.³ ............................................... G11B 5/09
[52] U.S. Cl. ......................................... 360/48; 360/40
[58] Field of Search .............................. 360/40, 39, 48

[56] References Cited

U.S. PATENT DOCUMENTS 3,743,793 7/1973 Emerson ............................... 360/48

Primary Examiner—Vincent P. Canney
Attorney, Agent, or Firm—Banner, Birch, McKie & Beckett

[57] ABSTRACT

Increased recording speed is possible, in a system in which an endless recording medium is used to record units of information, by dividing the medium, in the direction of its length, into at least first and second successive regions. Several units of information can be recorded during a single excursion of the endless medium by recording the first, $n+1, 2n+1, 3n+1 \ldots$ units in the first region and the second, $n+2, 2n+2, 3n+2 \ldots$ units in the second region, where n equals the total number of regions. This system is suitable for use with a recording medium which has plurality of parallel information recording tracks. Another expression to describe which information units are recorded in the jth region is $(k-1)n+j$, where j and k are positive integers.

3 Claims, 14 Drawing Figures

INFORMATION RECORDING SYSTEM

This application is a continuation, of application Ser. No. 203,976, filed Nov. 4, 1980.

BACKGROUND OF THE INVENTION

This invention relates to an information recording system for use in a magnetic tape system which permits storing and searching of image information.

Recently, there have been developments in image information storing and searching systems. These systems can store visual image information obtained from documents through two-dimensional optical scanning. The system additionally permits a desired portion of the stored image information to be searched and subsequently reproduced for recording or displaying. In large-capacity image information memorizing systems, the use of magnetic tape has been proposed as the storage medium.

In such magnetic tape systems an endless magnetic tape is employed having a plurality of parallel recording tracks extending in the direction of its rotational movement. More particularly, a magnetic head is moved in a direction at right angles to the direction of movement of the magnetic tape to thereby form a plurality of parallel recording tracks. Thus, a plurality of tracks can be used serially. For example, when recording document information, the document is fed page by page, image information (i.e., video signals) for each page is successively read and written as unit image information on the recording track. As shown in the prior art structure of FIG. 1, image information for the first page is recorded on frame number "1" of a first recording track of magnetic tape 23. A tape mark 26 establishes a reference position on magnetic tape 23 for frame number "1". The second page is recorded on frame number "2" adjacent to that of frame number "1" with an adequate space provided therebetween. Likewise, successive information for third (i.e., frame number "3"), fourth (i.e., frame number "4") and subsequent pages are successively recorded on the tape in the order of the pages read.

In the magnetic tape shown in FIG. 1, the endless magnetic tape is driven one complete excursion in about 7 seconds (e.g., the tape has a length of 36 m and is moved at a speed of 5 m/sec). Approximately 2 seconds is needed for reading one page of information from a document by optical scanning. The image information which has been read is stored in a buffer memory, and then recorded onto the magnetic tape. The period required for this recording is extremely short compared to the time period necessary to read information from the document due to high recording density and high tape speed. As a result, after recording the first unit of image information from the first page at the first frame position on the tape (i.e., frame number "1"), it is necessary to wait until the tape completes substantially one excursion from that position, so that the recording head will then come into position at the second frame position (i.e., frame number "2") to commence recording the next page or unit of image information from the document. This means that only one page or unit of information can be recorded with a single complete excursion of the tape; consequently, the recording efficiency is extremely low.

SUMMARY OF THE INVENTION

It is an object of the present invention to provide an information recording system which permits recording image information onto a recording medium with high recording efficiency.

It is further object of the present invention to provide an information recording system which permits an increase in processing speed of recording image information onto a recording medium.

The present invention is directed to providing an information recording system, which uses a recording medium having a plurality of parallel information recording tracks for recording information. The tracks contain at least a first and second region, wherein means are provided for transferring onto said first region the first, the n+1, the 2n+1, the 3n+1 . . . units of image information and further transferring onto said second region the second, the n+2, the 2n+2, the 3n+2 . . . units of image information, where n equals the total regions contained on the track. In this way several pages or units of image formation can be recorded with a single complete excursion of the tape, rather than requiring several excursions necessary in the prior art systems.

BRIEF DESCRIPTION OF THE DRAWINGS

FIGS. 2 to 11B illustrate one embodiment of the invention;

FIG. 2 is a block diagram showing an image information recording system;

FIG. 3 is a block diagram showing the image information recording system of FIG. 2 in detail;

FIG. 4 is a schematic view of a cassette tape and a tape feed mechanism;

FIG. 5 is a view showing the plurality of tracks and block arrangement of the magnetic tape;

FIG. 6 is a view showing the format of an information recording track;

FIG. 8 is a view showing a recording tape containing image information in accordance with another embodiment of the invention.

FIG. 9 is a block diagram showing a block counter;

FIG. 10 is a memory map showing RAMs (i.e., RAM1-RAM4) for use in controlling the recording of information;

FIGS. 11A-11C are flow charts showing the operation of an information recording system according to the invention.

DETAILED DESCRIPTION OF THE PREFERRED EMBODIMENT

Figure 2:
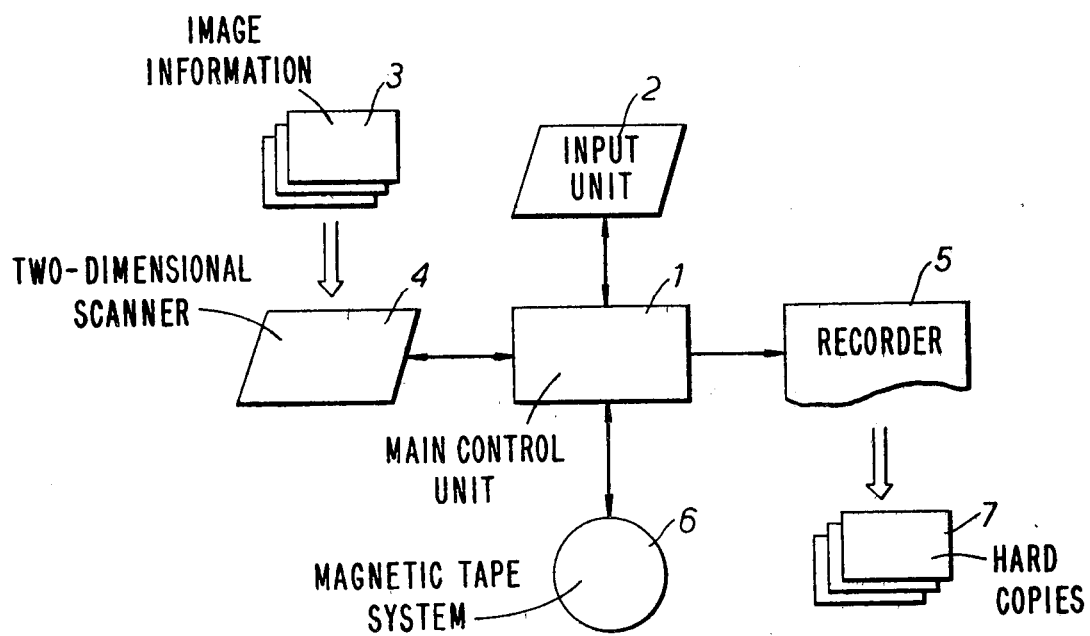

Referring now to FIGS. 2–7, an explanation will be given regarding a preferred embodiment of the invention. Shown in FIG. 2 are the basic elements of a prior art information recording system comprising: a main control unit 1 for performing compilation processing such as recording, reproduction, addition, insertion and deletion of image information according to input information. The input information is coupled from an input unit 2 having display capabilities and a keyboard for entering the desired processing information. Image information 3 from a document or the like is photoelectrically converted in a two-dimensional scanner 4 and the converted image information (i.e., video signals) is supplied via main control unit 1 to a recorder 5 or a magnetic tape unit 6. Recorder 5 receives image information directly from two-dimensional scanner 4 or reproduced image information from magnetic tape unit 6. Recorder 5 then converts the image information into a two-dimensional visible image which is provided as hard copies 7.

Figure 4:
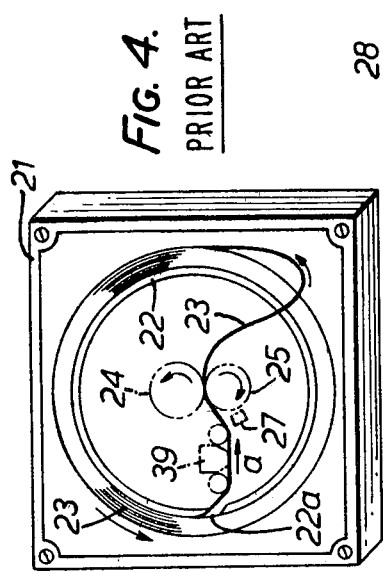

As shown in FIG. 4, a prior art cassette 21 which accomodates a stationary reel 22, and an endless magnetic tape 23 wound or reel 22. The tape, for example, can have a width of approximately 12.7 mm and a length of approximately 36 m. When the tape cassette of the above construction is loaded, an innermost portion of the tape is fed through a window 22a on reel 22. This portion is then fed at a high rate of speed (e.g., about 5 m/sec.) in the direction shown by a capstan 24 and pinch rollers 24, 25 and is again wound on the outer periphery of tape 23. Tape 23 completes one complete excursion in about 7.2 seconds. One excursion of tape 23 can be detected by utilizing a mark detector 27 which detects a tape mark, such as silver paper 26, placed on a predetermined portion of a juncture 23a of tape 23 (see FIG. 5). The output signal from detector 27 is also used as a reference for detecting block positions (as described below) on tape 23.

Figure 5:
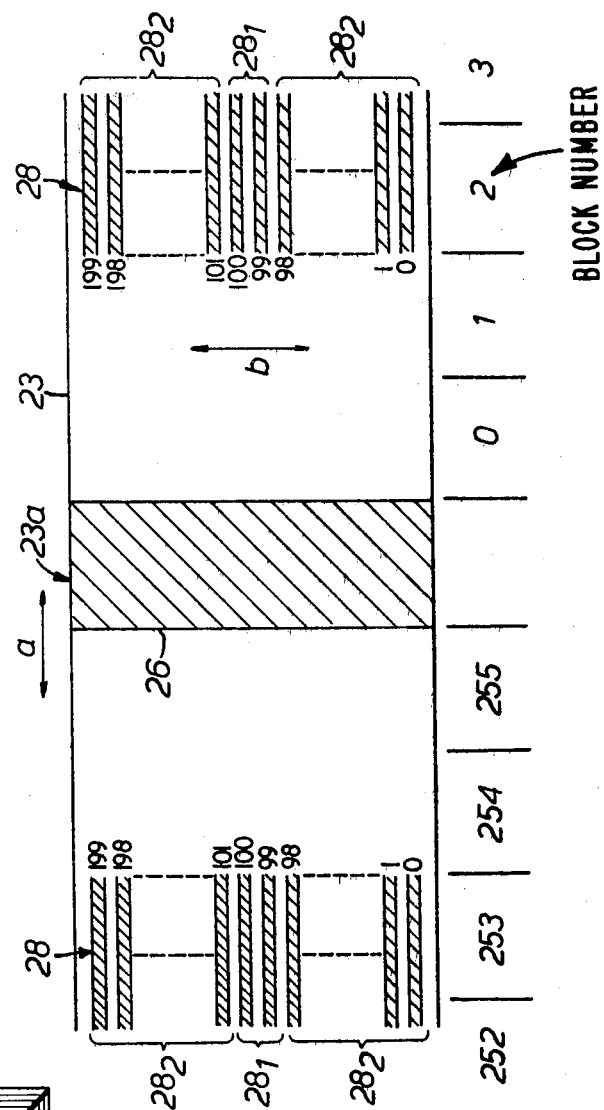

As shown in FIG. 5, tape 23 has 200 parallel recording tracks (with a track width of about 40 um and a track pitch being set to about 52 um) extending in the direction of its movement. Recording tracks 28 are given successive track numbers "0", "1", "2", - - - , "198", "199". Of these tracks, the two tracks located substantially at the central position (i.e., track numbers "99" and "100") are index recording tracks $28_1$ for recording index information peculiar to each unit of image information. The index information consists of an index code and a recording address, containing a track number and a block number. The other 198 tracks (i.e., track numbers "0" to "98" and "101" to "199") are information recording tracks $28_2$ for recording units of image information. Tape 23 is divided into 256 blocks in the direction of its length. The individual blocks are given successive block numbers "0", "1", "2", - - - , "254", "255" with tape mark 26 as a reference. During recording or reproduction of information signals on or from tape 23, a desired recording track 28 is selected by reciprocating a recording/playback head 39 to the desired position. Head 39, positioned in the neighborhood of capstan 24, is reciprocatively moved by a head access mechanism (not shown) positioned in direction b perpendicular to the direction of the tape running direction a at intervals of one micron.

Figure 6:
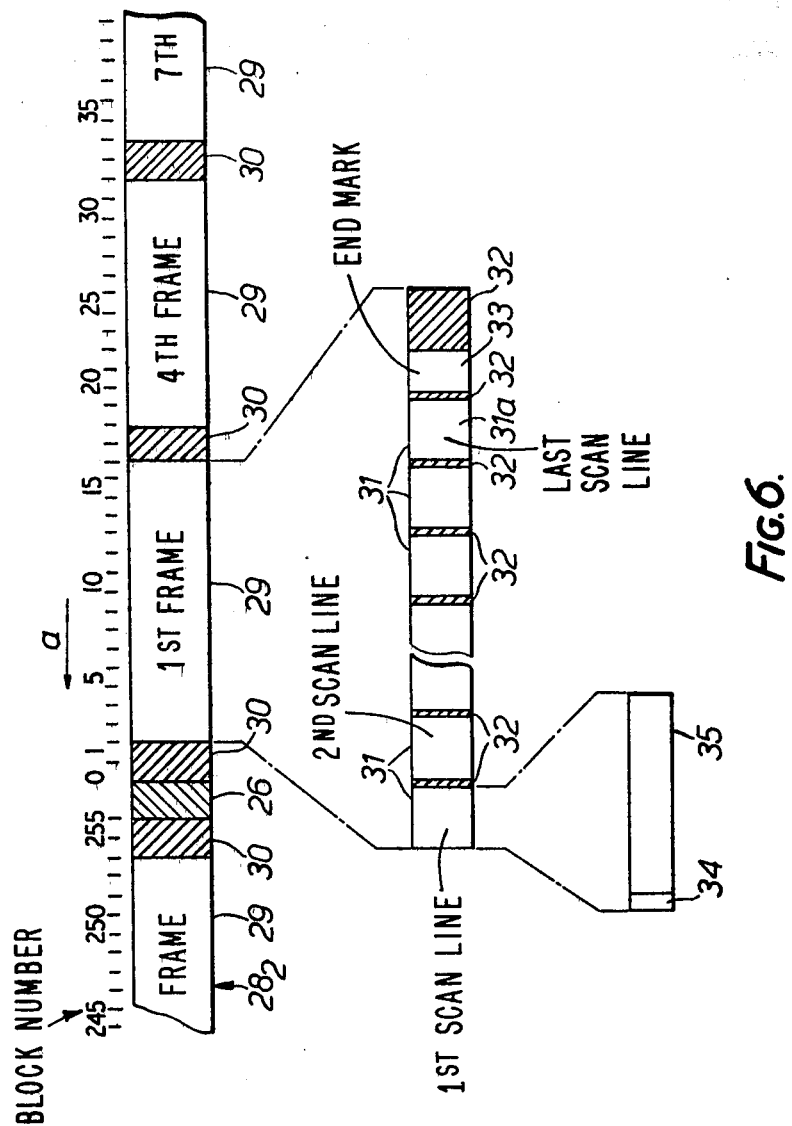

FIG. 6 shows the format of a single track of information recording tracks $28_2$ for recording image information thereon. Each of the individual information recording tracks are divided into 256 blocks which are counted during recording. Image information for one page of a document (i.e., one unit of image information) is recorded along track $28_2$ as one frame, for example, frame 29. Each frame consists of a plurality of blocks. Each frame is bounded on each side with block gaps 30 (i.e., non-recording areas) which are provided as delimiting area between adjacent frames 29. In each frame 29, a plurality of image information scanning lines 31, each produced by reading of one scan line of the document, are serially recorded. Adjacent image information scan lines 31 are delimited by an 8-bit line gap code 32. Further, a frame end mark 33 is recorded after the image information 31a, corresponding to the last scanning line, is recorded. Before recording the line image information 31, in a serial manner, a start mark 34 is first recorded. With 200 tracks each capable of recording about 15 pages therein, about 3,000 pages of A4 size (210 mm×297 mm) document information can be recorded in one cassette tape.

Figure 3:
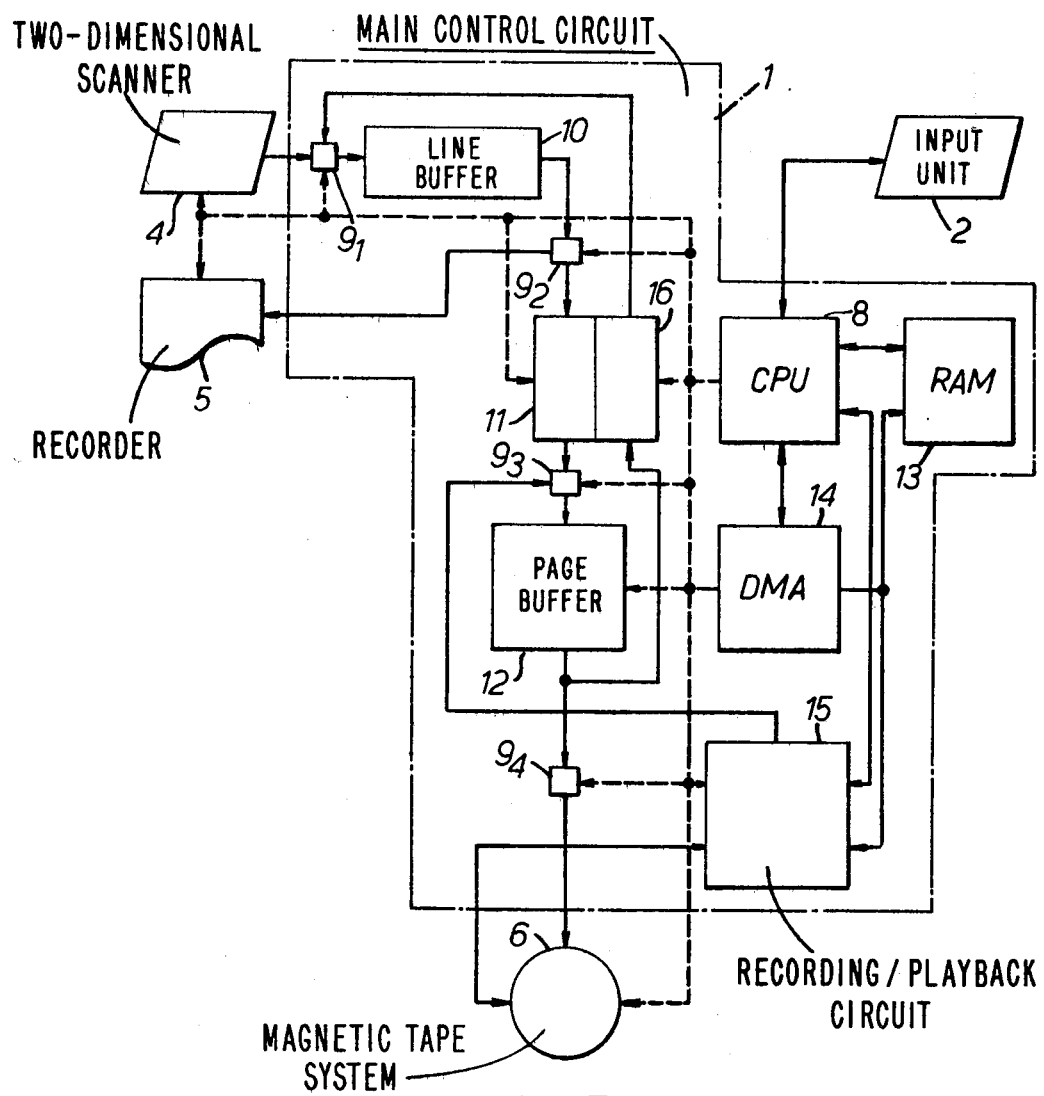

As shown in FIG. 3, when a storing command and the index code of the name or title of the image information to be stored are coupled from input unit 2, a central processing unit (CPU) 8 operates the two-dimensional scanner 4 and magnetic tape unit 6. Two-dimensional scanner 4 photoelectrically converts image information 3 from a document or the like by two-dimensional scanning with a laser beam. The converted image information is stored for each scanning line via a selector $9_1$ in a line buffer memory 10. At this time, a memory of a very large capacity is required if image information for one unit (i.e., one page) is directly recorded. However, since the image information which represents a document often contains many redundant portions, it is advantageous to store the information after compression (i.e., reduction of the redundancy). Consequently, the line information stored in line buffer 10 is supplied via a selector $9_2$ to a signal compression circuit 11 for bandwidth compression therein by MH (Modified Hofman) conversion. MH conversion is a technique employed for compressing information and adopted as an international standard in the field of facsimile by the CCITT (International Telegraph and Telephone Consultation Committee). It is a one-dimensional run length coding system, in which the longest run length as one line is set to 1, 728 bits (corresponding to the dimension of the short side of A4 size). Here, certain codes are predetermined according to the bit numbers of white run lengths (i.e., lengths of portions constituted by continuous white elements). Similarly, certain codes are predetermined for black run lengths (i.e., lengths of portions constituted by continuous black elements). For example, a code "10011" is predetermined for 8 continuous white bits, and a code "0011" for 5 continuous black bits. When document information is scanned, white and black portions of information are alternately obtained as a natural result, and the bit numbers of these white and black portions of information are calculated for encoding according to the bit number. Through this MH conversion the document information is compressed to about one-sixth of the original quantity for temporarily memorizing in the page buffer 12. The compressed line image information is then supplied through a selector $9_3$ to a page buffer 12. When all the image information for one unit (i.e., one page) is stored in page buffer 12, CPU 8 instructs recording/playback head 39 to move to a position corresponding to an information recording track $28_2$ for recording new image information therein. At that time, the image information in page buffer 12 is supplied to the tape and recorded in a specified block thereon. The page buffer supplies this information to the head 39 for each scanning line via a selector $9_4$.

The afore-mentioned selectors $9_1$, $9_2$, $9_3$, and $9_4$ consist of, for example, respective logic gate circuits and are controlled by CPU 8. The selector $9_1$ selects as the input to line buffer 10 either information from two-dimensional scanner 4 or information from page buffer 12 coupled through signal elongation circuit 16. At the time of scanning a document, selector $9_1$ directs information from the two-dimensional scanner 4 to the line buffer 10, while at the time of producing hard copy it directs information from the page buffer 12. The selector $9_2$ selectively couples the information from the line buffer 10 either to recorder 5 or to signal compression circuit 11. At the time of scanning a document, selector $9_2$ directs information from the line buffer 10 to the recorder 5 while at the time of producing hard copy it leads the line buffer information to the signal compression circuit 11. The selector $9_3$ selects as the input to the page buffer 12 either information from signal compression circuit 11 or information from a recording/playback circuit 15. At the time of scanning a document, selector $9_3$ directs information from the signal compression circuit 11 to the page buffer 12, while at the time of producing hard copy it leads information from the recording/playback circuit 15. The selector $9_4$ leads information from the page buffer 12 to magnetic tape unit 6. In FIG. 3, solid lines represent information signal lines, and dashed lines represent control signal lines.

Figure 1:
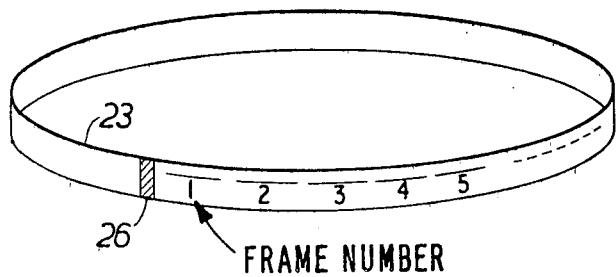
FIG. 1 is a view of illustrating an endless tape of the prior art containing recording tracks of video information.
Figure 7A:
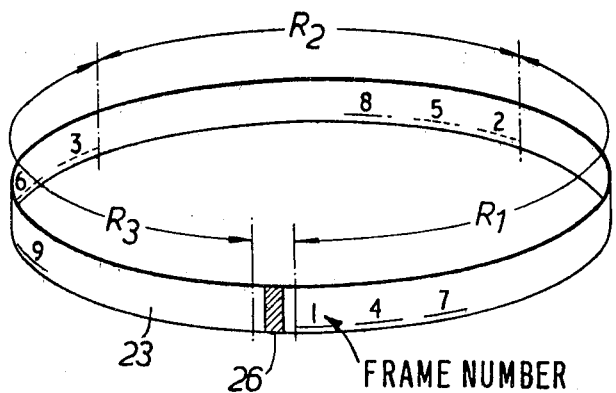
FIGS. 7a and 7b are views showing a recording tape containing image information in accordance with the invention.
Figure 9:
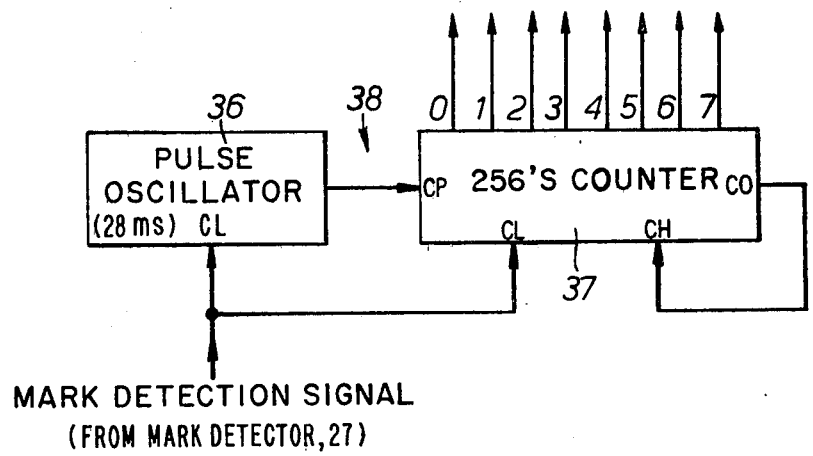

FIG. 7a shows the novel method of recording on the tape which permits high recording efficiency. In particular, according to the invention each track is divided into three successive regions, and recording is made cyclically in these three successive regions for each complete excursion of the tape. The first frame is recorded in a first region $R_1$ of track one, the second frame in a second region $R_2$ of track one, and the third frame in a third region $R_3$ of track one. After completion of one excursion of the tape, the fourth frame is recorded after the first frame in the first region $R_1$ of track one, the fifth frame after the second frame in second region $R_2$ and the sixth frame after the third frame in third region $R_3$. When the capacity of each region is exceeded in the first track, head 39 is moved to a position corresponding to the next parallel track to provide recording in a similar manner in the three successive regions (shown in FIG. 7B). Accordingly, recording for three pages, (i.e., three units of image information) can be obtained with one complete excursion of tape 23, rather than requiring several excursions as shown in the prior art method of recording of FIG. 1. A block counter 38 (shown in FIG. 9) is provided within CPU 8 of main control unit 1. The block counter counts up by clock pulses which occurs simultaneously with the running of tape 23, and counts "0" to "255" during one excursion of tape 23. The counting of the block counter is cleared by the output signal of mark detector 27.

Block counter 38 includes a pulse oscillator 36 for producing a clock pulse signal with a pulse period of about 28 msec. and a 256's counter 37 by 8 bits for effecting counting operation according to the pulse output of the pulse oscillator 36. When all output signals of counter 37 are "1" (i.e., the content of counter 37 is "255") a carry out signal is produced from a carry out terminal CO. The carry out signal is applied to a count hold terminal CH. As a result the counter 37 holds its content to "255". The pulse oscillator 36 and counter 37 are cleared by a mark detection signal produced from the mark detector 27 (shown in FIG. 4).

Figure 10:
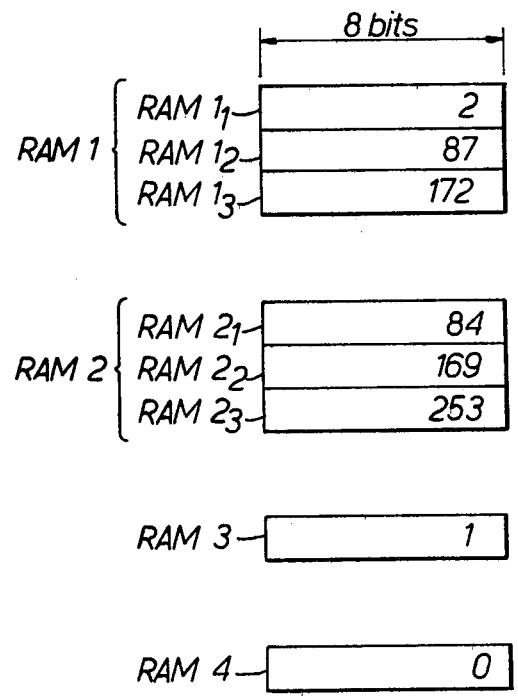

CPU 8 controls the positioning of the information to be recorded onto the track, and the selection of the track number. CPU 8 includes RAMs for controlling the recording of information. As shown in FIG. 10, it includes RAM1 through RAM4. The RAM1 and RAM2 respectively consist of $RAM1_1$ through $RAM1_3$ and $RAM2_1$ through $RAM2_3$; these RAMs each having a memory capacity of, for example, 8 bits. RAM1 stores the initial block positions of the block numbers into which the image information will be recorded in the respective first to third regions $R_1$, $R_2$ and $R_3$. For example, since tape 23 is divided into three regions and two blocks are provided adjacent to each side of tape mark 26 (see FIG. 5—i.e., blocks "0", "1" and "254", "255", as non-recording areas 30), "2" will be stored in $RAM1_1$, "87" in $RAM1_2$, and "172" in $RAM1_3$ as respective initial values. RAM 2 stores the block numbers of the last blocks in the first to third regions $R_1$ to $R_3$. In this embodiment a value "84" is memorized in $RAM2_1$, "169" in $RAM2_2$ and "253" in $RAM2_3$ for the aforementioned reason. The RAM3 is provided for specifying the region in which to make the recording. For example, when recording is to take place in the first region, "1" is first stored in this RAM. RAM4 is provided for specifying the track number into which the recording is to be made. For example, when recording is to take place on track number "0", "0" is first stored in this RAM.

Main control unit 1 includes a random-access memory RAM 13 serving as an index searching memory for storing track numbers and block numbers of recorded pages. When storing information, the index information in RAM 13 is recorded in the index recording track $28_1$ of a magnetic tape 23 in response to a command from a direct memory access DMA 14 to be described later. When searching for information, the desired index information is coupled from input unit 2 to CPU 8 and the recorded information in index recording track $28_1$ is recorded in RAM 13 through a recording/playback circuit 15 in response to a command from DMA 14. The information coupled to CPU 8 and the index information transferred to RAM 13 are then compared. DMA 14 is used for writing and reading of information among page buffer 12, RAM 13 and tape 23. At this time, exchange of information is directly made between the memory and tape by temporarily stopping the operation of CPU 8.

When storing information for the first page is 0 recorded onto block number "2" through block number "16". As discussed previously, no information is stored onto blocks "254", "255", "0" and "1" which are on either side of tape mark 26 since these blocks represent non-recording areas 30. CPU 8 reads the content of the block counter at the end of recording each frame of image information and determines if this value is smaller than block number "84" representing the position of the last block of the first region $R_1$. If the value of the block counter is found to be smaller than "84", the content of the block counter is added to a value equal to "3", the resulting value corresponds to the beginning of the next frame when recording is resumed in the first region $R_1$. The value "3" takes into account the two blocks for non-recording area 30 between adjacent frames. The resulting value together with the track number is stored in RAM 13. The resulting value is also stored in CPU 8.

As shown in FIG. 7A, after representing the first page, frame "1" is recorded, the recording for the second page is commenced. At this time, CPU 8 affects recording of the second page in the second region. As previously discussed, the initial value of "87" represents the address of the block to begin this recording in the second region $R_2$. Likewise, the content of the block counter is read and determined if this value is smaller than the block number "169", the last block available for storing information in the second region $R_2$. If the value of the block counter is found to be smaller than "169", the content of the block counter is added to a value equal to "3"; the resulting value corresponds to the beginning of the next frame when recording is resumed in the second region $R_2$. The resulting value together with the track number stored in information in RAM 13 and in the memory portion in CPU 8.

The resulting value and track information which is stored in RAM 13 and CPU 8 and which corresponds to the next region to receive recording is read during the time it takes to scan one document page (e.g., about 2 seconds). This time period is less than about ⅓ of the seven second period required for one excursion of magnetic tape 23.

As shown in FIG. 7A, when the second page is recorded as second frame "2" on tape 23 in the above manner, the recording of the third page in third region $R_3$ is commenced. In this way, one excursion of tape 23 permits the recording of three pages of a document. Similarly, during the second excursion of tape 23 individual pages are recorded in the respective regions on the basis of the resulting values stored in RAM 13 and the memory portion of CPU 8.

When searching for and reproducing image information which is recorded on the tape, the position of the information on the tape is detected by a comparison of the index code coupled from input unit 2 and the index information recorded in index recording track $28_1$. This image information is supplied to recording/playback circuit 15 and stored in page buffer 12 through selector $9_3$. When the reproduced information for one page is entirely stored in page buffer 12, CPU 8 causes this image information, compressed, to be transferred for each scanning line to a signal elongation circuit 16. The circuit provides bandwidth elongation through converse MH conversion to recover the original image information. This original image information is successively supplied through selector $9_1$ to line buffer 10. The line information supplied to line buffer 10 is progressively supplied as serial through selector $9_2$ to recorder 5. As a result, recorder 5 produces reproduced image information as hard copies 7.

Figure 11A:
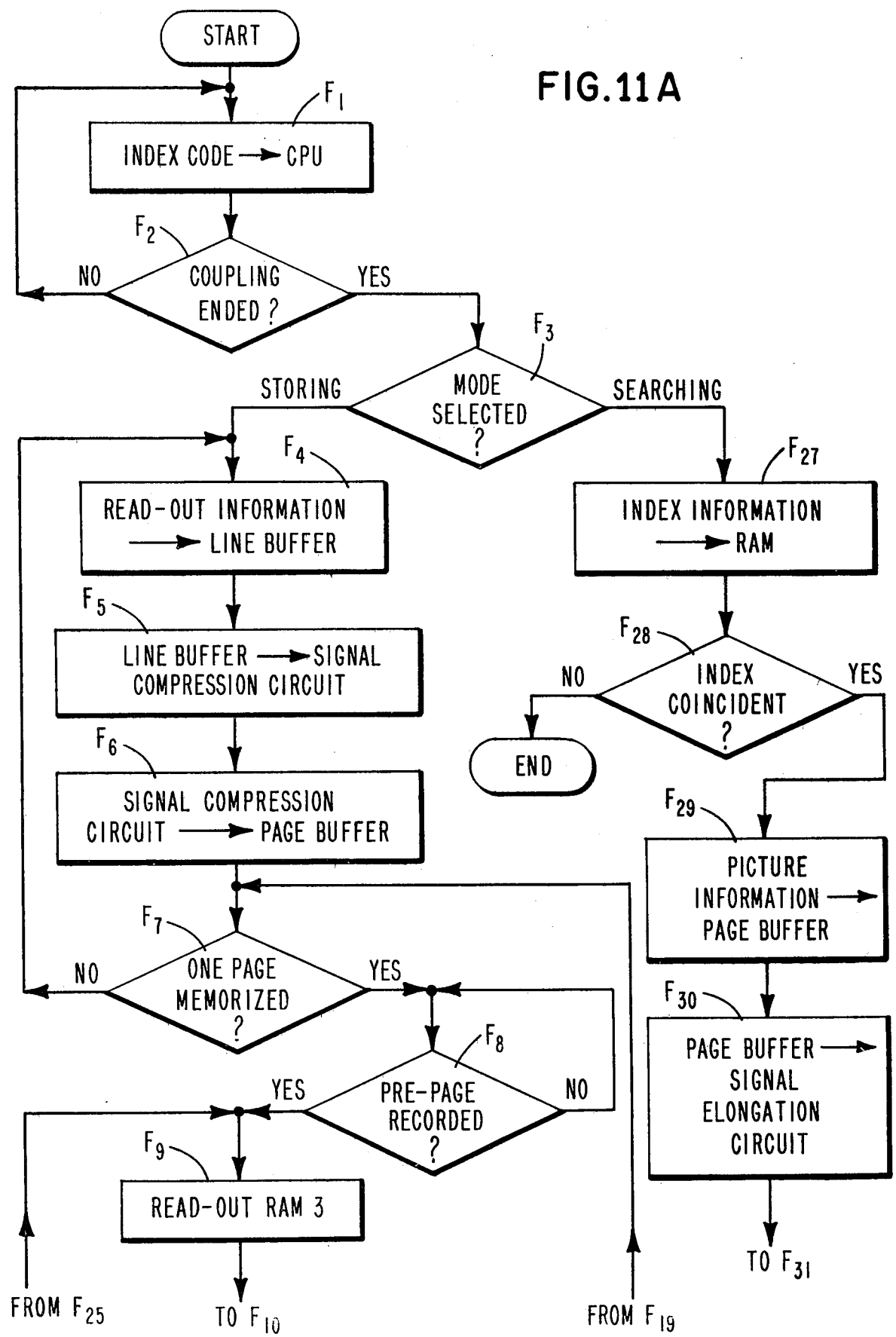
Figure 11B:
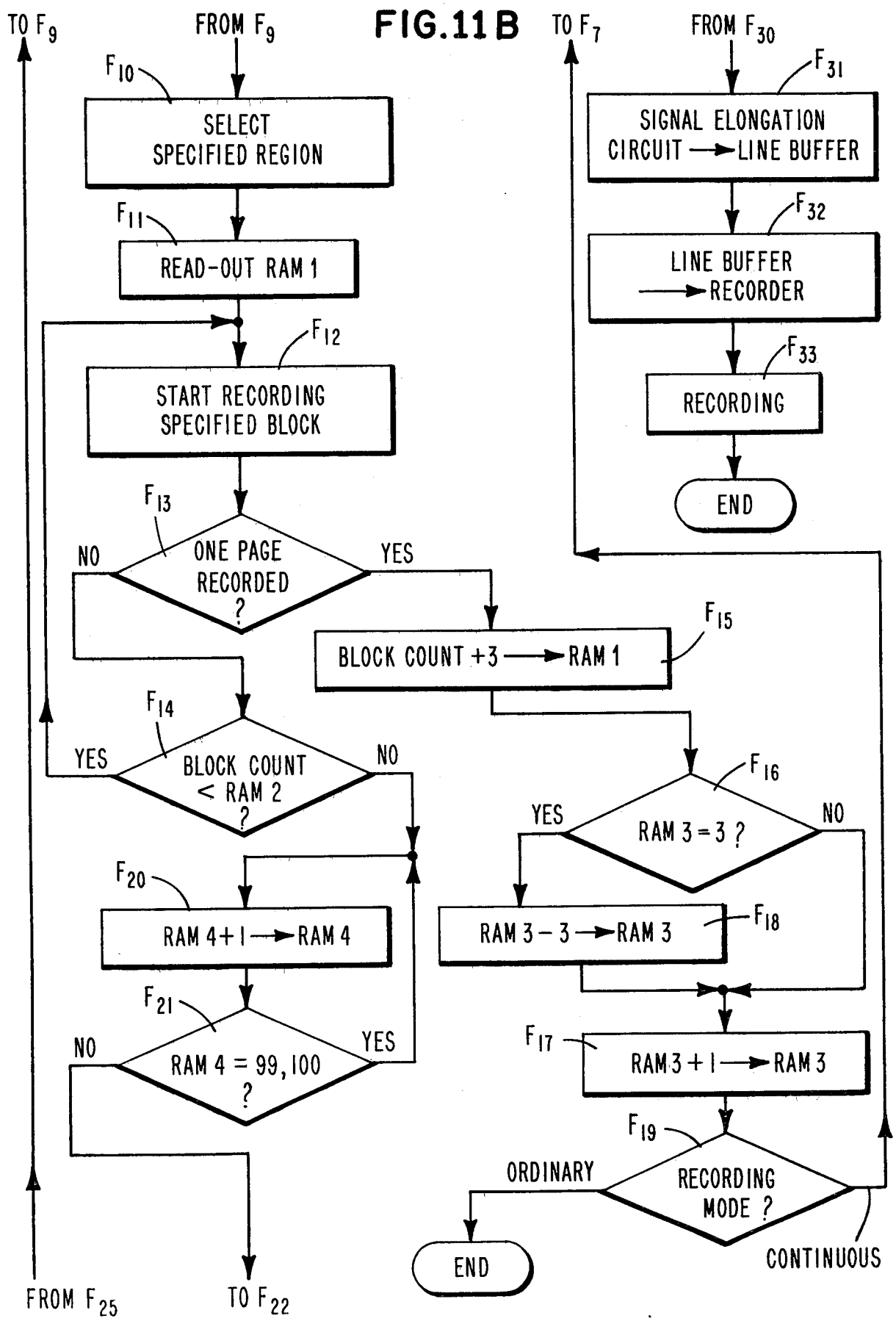
Figure 11C:
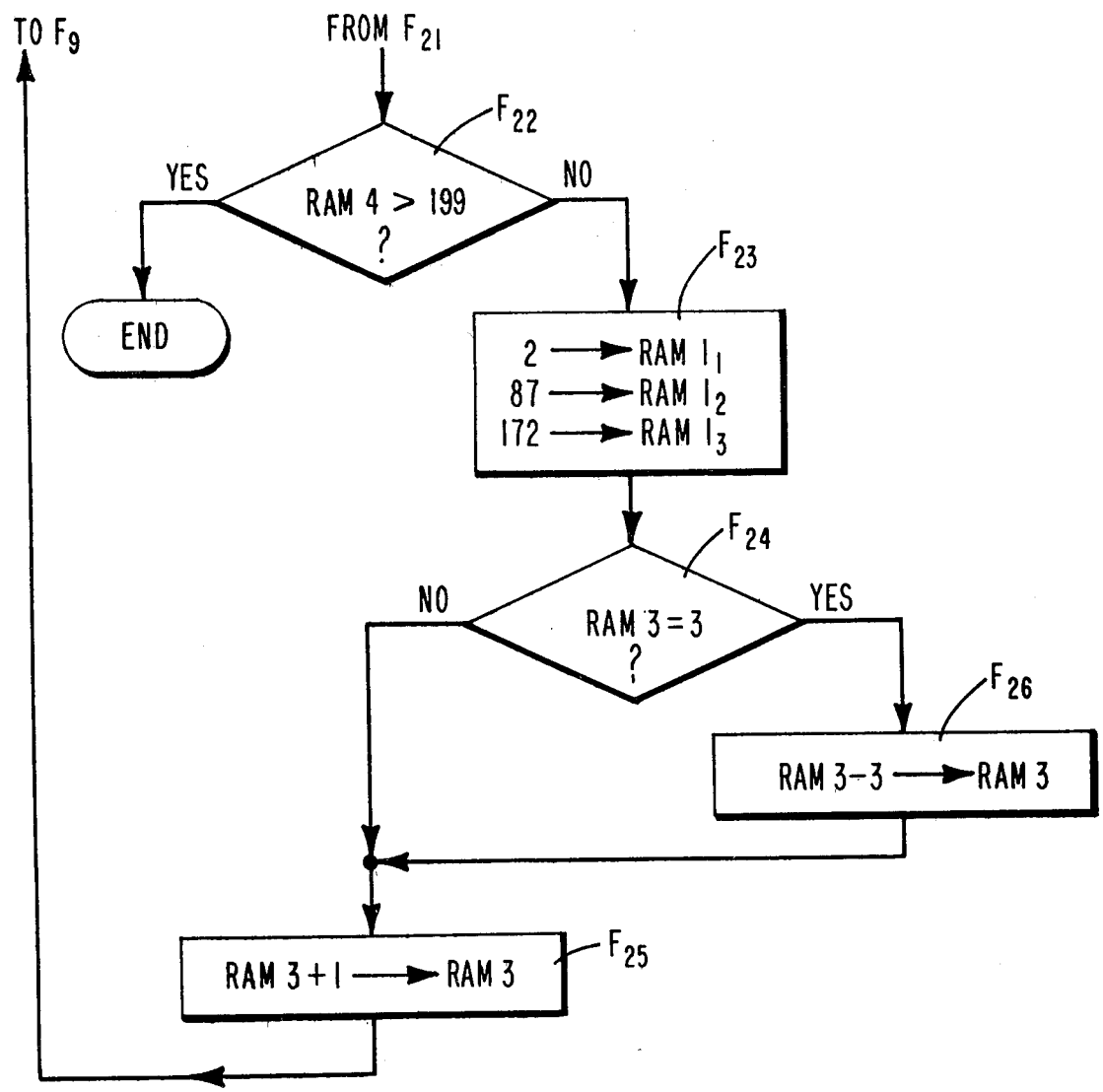

The method of storing and searching for picture information with the system according to the invention will be described with reference to the flow chart of FIG. 11. For example, the case of storing a series of continuous document information will be discussed. In this case, two-dimensional scanner 4 is set so that a series of document information can be successively and continuously read out from the first page. Then, a continuous mode for making continuous recording and a storing mode are set in input unit 2, and the index codes of the individual pages of the document information to be stored as successively coupled, for instance, in the order of the pages. The CPU 8 successively receives the index codes, coupled in a step labeled $F_1$ in FIG. 11, and transfers them to the RAM 13 for storage. Then, CPU 8 then determines (step $F_2$) whether or not the coupling of all the index codes has ended. If the coupling has ended, it then proceeds to step $F_3$ of checking the selected mode. Since the storing mode is selected, as mentioned earlier, the CPU 8 affects steps $F_4$ through $F_6$, activating the two-dimensional scanner 4 and the magnetic tape unit 6 and causing the read-out information to be successively supplied to the page buffer 12. More particularly, the two-dimensional scanner 4 is caused to photoelectrically convert the document information received from the first page by two-dimensional optical scanning with a laser beam. The photoelectrically converted picture information is coupled one scanning line after another through selector $9_1$ to the line buffer 10 for temporary storage. If the picture information of one unit quantity (i.e., for one page) is to be directly stored, a memory circuit having a very large capacity is required. However, the picture information representing a document contains very much redundancy; consequently, it is advantageous to store the information after compression (i.e., reducing the redundancy). Accordingly, the line information stored in line buffer 10 is supplied through selector $9_2$ to the signal compression circuit 11 for bandwidth compression by the aforementioned MH conversion, and the compressed line information is then coupled through selector $9_3$ to page buffer 12.

CPU 8 then determines it (step $F_7$) the picture information for one page is stored in page buffer 12. If one page of information is stored, it proceeds to step $F_8$ to check whether or not the recording of the previous page has ended. Since the instant case involves the recording of one page, it proceeds through steps $F_9$–$F_{12}$. That is, CPU 8 causes the head 39 to be moved up to a position corresponding to the information recording track $28_2$ for recording picture information and starts recording in blocks from the specified one by causing the picture information in the page buffer 12 to be supplied upon scanning one after another through selector $9_4$ to the magnetic tape unit 6 (i.e., head 39).

The recording of picture information by the system of the invention is carried out in the following way. For purposes of brevity, the case of recording on track number "0" of a new tape is considered. In this case, the contents in the RAM3 in the CPU 8 are set as shown in FIG. 10. CPU 8 reads out the content of RAM3 (step $F_9$) and then selects the specified region (step $F_{10}$) upon which to read out the content of RAM1 (step $F_{11}$). Since in this case the content of the RAM3 is "1", the first region $R_1$ is selected, and its initial value "2" is read out from RAM1$_1$. Then, CPU 8 begins (step $F_{12}$) recording of one page of picture information in track number "0" of tape 23 as specified by RAM4. More particularly, CPU 8 sets head 39 in a position corresponding to recording information on track $28_2$ of track number "0" (specified by RAM4) and examines the content of the block counter 38 so as to start the recording when the content of the counter becomes "2". The recording is made one scanning line after another as the picture information in the page buffer 12 is supplied one scanning line after another as mentioned earlier.

The CPU 8 then determines (step $F_{13}$) whether or not the page of picture information has ended. If the recording has not ended, it then compares (step $F_{14}$) the content of block counter 38 and the content of RAM 2, in this case the content of RAM2$_1$. That is, a determination is made whether or not the counter content is smaller than the last block available for recording in the first region $R_1$ (i.e., block number "84"). If the counter content is smaller, the CPU 8 returns to the step $F_{12}$ and follows through the steps up to step $F_{14}$. This is repeated until the recording of one page has ended. Upon detecting that the recording of one page has ended, CPU 8 proceeds to read out (step $F_{15}$) the content of block counter 38 at the instant of the end of recording; it then adds "3" to the read-out value and transfers the result to the RAM1$_1$ for storage. This has an effect of replacing the content of RAM1$_1$ with the block number of the first one of the blocks for recording the next picture information (i,e., the fourth page in this case). When this process has ended, CPU 8 determines whether or not the content of the RAM3 is "3" (step $F_{16}$). Since in this case the content is still "1", CPU 8 proceeds to step $F_{17}$. If, however, the content of RAM3 is "3", CPU 8 adds "-3" to this content and transfers the result to RAM3 for storage. In step $F_{17}$, CPU 8 adds "1" to the content of the RAM3 and transfers the result to the RAM3 for storage. This has an effect of replacing the content of the RAM3 with the number specifying the region in which to record the next picture information; in this case the number "2" corresponding to second region $R_2$ for recording the second page of picture information.

In this way, the picture information for one page is recorded as a first frame on tape 23 in the first region $R_1$ thereof as shown in FIG. 7A. When this has ended, CPU 8 determines if the recording mode is the continuous mode (step $F_{19}$). If the checked mode is not the continuous mode (i.e., the ordinary mode) the recording operation as a whole is terminated. Since in this case the continuous mode is set, the CPU 8 returns to step $F_7$ and effects a similar operation to the one described above for recording the second page of picture information. Since in this case the content of the RAM3 is "2", the second region $R_2$ is selected, and the initial value "87" thereof is read out from the $RAM1_2$. The recording of the second page of picture information is made in block number "87" corresponding to the initial value of region $R_2$. Since in this case the second region $R_2$ is selected, the content of block counter 38 and the content of the $RAM2_2$ are compared (step $F_{14}$). In this way, the second page of picture information is recorded in the second region $R_2$ of the tape 23 as shown in FIG. 7A. When this has ended, recording of the third page in third region $R_3$ is begun in the manner described above. Thus, picture information for three pages can be recorded with one excursion of the tape 23. In the second excursion of the tape, the following three pages are similarly distributed in the respective first to third regions ($R_1$ to $R_3$) shown in FIG. 7A according to the block numbers into which the recording is to be made. These block numbers are stored in the RAMs of the CPU 8 as was done with the previous recording.

According to the invention, the image information from a document page is recorded at the tape position that arrives after one-third of the excursion of the tape from the recording position on the tape corresponding to the previous page. Accordingly, continuous image information for three pages can be obtained with one excursion of the tape. In this case, it is assumed that it takes about 2 seconds to produce the reproduced image information for one page while one excursion of the tape takes about 7.2 seconds.

Figure 7B:
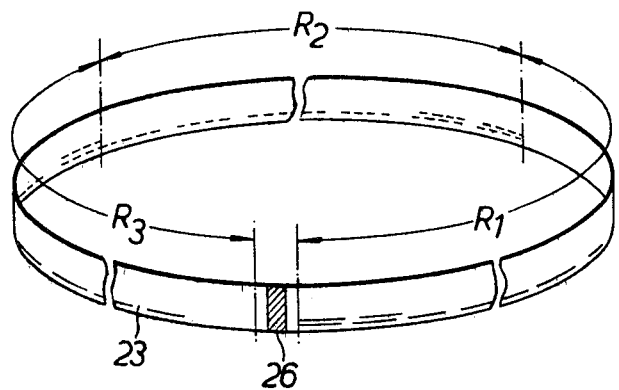

In the continuous recording of information in information recording track $28_2$ of track number "0" where any one of the first to third regions $R_1$ to $R_3$ is filled with recorded information, CPU 8 temporarily stops the recording operation at that instant and moves the head to a position corresponding to the next track number "1" before resuming the recording. More particularly, if the content of block counter 38, checked in step $F_{14}$, becomes equal to the content of the RAM2, the CPU 8 temporarily stops the recording operation at that instant and proceeds to step $F_{20}$ of adding "1" to the content of the RAM4 and coupling the result to the RAM4 for storage. That is, it specifies the track number in which to resume the recording. Then, it proceeds to step $F_{21}$ to determine if the content of RAM4 is the same as the track number "99, 100" of the index recording track $28_1$. If the answer is "YES", CPU 8 returns to step $F_{20}$ for avoiding the track $28_1$. If the answer is "NO" or becomes "NO" after repeated execution of step $F_{20}$, CPU 8 proceeds to step $F_{22}$ to determine if the content of the RAM4 is greater than the largest available track number "199". If the answer is "YES", no further recording can be made. Thus, in this case, the recording operation has ended. If the answer is "NO", the CPU 8 proceeds to a step $F_{23}$. In this step, new initial values are stored in the RAM1; that is, a value "2" is stored in $RAM1_1$, "87" in $RAM1_2$, and "172" in $RAM1_3$. Then, CPU 8 effects the following steps $F_{24}$ through $F_{26}$, which are respectively similar to the aforementioned steps $F_{16}$ through $F_{18}$. When the process of the step $F_{25}$ has ended, it returns to the step $F_9$ and effects similar operation to that described above. In this way, information is successively recorded in the first to third regions ($R_1$ to $R_3$) of track number "1" as shown in FIG. 7B.

When the reading and recording of the entire picture information has ended, the continuous mode is released to bring an end to the operation of recording picture information, and the recording of index information in index recording track $28_1$ is then made.

The searching for and reproduction of the picture information recorded and stored in the above manner will now be described. This operation is the same as in the case of the storing mode up to step $F_3$, but after step $F_3$, steps $F_{27}$ through $F_{33}$ are executed. More particularly, the index code for the required picture information is coupled to the input unit 2 (see FIG. 3) while setting this unit in a searching mode. Then, CPU 8 receives the coupled index code (step $F_1$), and determines if the coupling of index code has ended (step $F_2$). If the coupling of the index code has ended, CPU 8 proceeds to step $F_3$ to check the selected mode. Since in this case the searching mode has been set, CPU 8 reads out the index information group (step $F_{27}$) recorded in the index recording track $28_1$ of the tape 23 and couples the read-out information to RAM 13 for storage. More particularly, CPU 8 moves tape 23 while causing head 39 to be moved to a position corresponding to index recording track $28_1$. Then, CPU 8 gives an information transfer command to the DMA 14. Thus, DMA 14 gives a reproduce command to the recording/playback circuit 15 to receive reproduced information from the head 39 and couples the received information (i.e., index information group) to RAM 13 for storage. CPU 8 then proceeds to step $F_{28}$ to compare successive index codes in the index information group stored in RAM 13 with the coupled index code, i.e., checking for an index code that coincides with the coupled index code. If no index code that coincides with the coupled one is found, the searching operation will end while effecting an error display or the like.

When an index code that coincides with the coupled one is found, CPU 8 proceeds to step $F_{29}$, in which the corresponding picture information is read out and supplied to page buffer 12. More particularly, when an index code coinciding with the coupled one is found, CPU 8 determines the track number and block number contained in the coincident index code, stored in RAM 13, and temporarily stores these data in a specified area in RAM 13. Then, CPU 8 causes head 39 to be moved up to a position corresponding to information recording track $28_2$ of the stored track number and starts reproduction from this track. Since at this time the block counter 38 is being operated, upon coincidence of the counter content with the block number stored in the specific area, the CPU 8 successively couples the reproduced information from that instant through the recording/playback circuit 15 and selector $9_3$ to page buffer 12. When the reproduced picture information for one page is entirely stored in the page buffer 12, CPU 8 proceeds to steps $F_{30}$ and $F_{31}$. More particularly, the picture information in the page buffer 12 is supplied one scanning line after another to the signal elongation circuit 16 for bandwidth elongation through reverse MH conversion to obtain the original picture information. This information is then successively coupled through the selector $9_1$ to the line buffer 10. CPU 8 then executes steps $F_{32}$ and $F_{33}$. More particularly, the information supplied to the line buffer 10 is successively coupled through the selector $9_2$ to the recorder 5. This information represents serial information signals synchronized to the timing of the recorder 5. Thus, the recorder 5 produces a hard copy 7 of the reproduced picture information.

Figure 8:
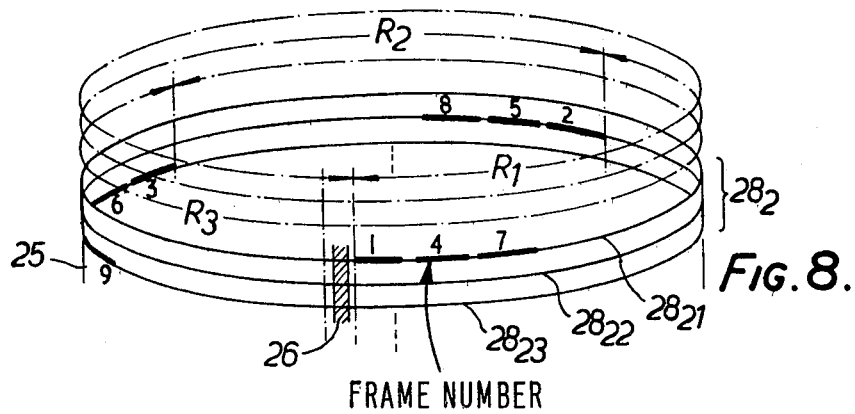

In FIG. 8, another embodiment of an information recording system is shown. Image information for the first page (i.e., frame number "1") is recorded in a first track $28_2$ along a first region $R_1$ beginning from block number "2" (see FIG. 6). The next page (i.e., frame number "2") is recorded in a second track $28_{22}$ along a second region $R_2$ beginning from block number "87". The third trade $28_{23}$ beginning from block number "172".

The invention may also be applied to other kinds of recording medium such as a magnetic disc or an optical disc which permits recording and playback by utilizing laser beam.

I claim:

1. In an information recording system for storing pages of document information as digital signals comprising:
    an endless recording medium for recording digital signals thereon, said recording medium being divided, in the direction of its length, into at least a first and a second successive region;
    information supply means for supplying successive units of information to be recorded on said medium including a first, second, third, etc. units of information, said information supply means requiring a first length of time to supply each unit of information, said information supply means including photoelectric scanning means for converting the document information into the digital signals, the digital signals representing one document page comprising one unit of information;
    buffer means for accumulating the digital signals supplied by said information supply means until a unit of information has been accumulated; and
    control unit means for transferring the accumulated unit of information from said buffer means to said recording medium, said control unit means requiring a second length of time to transfer each unit of information, the second length of time being extremely short compared to the first length of time;
    the improvement comprising means within said control unit means for transferring into said first region the first, the $n+1$, the $2n+1$, the $3n+1$ ... units of information supplied from said supply means, and further transferring into said second region the second, the $n+2$, the $2n+2$, the $3n+2$ ... units of information supplied from said supply means, where n equals the total regions contained on the medium.

2. The information recording system of claim 1 wherein said endless recording medium is an endless magnetic tape.

3. In an information recording system for storing pages of document information as digital signals comprising:
    an endless recording medium for recording digital signals thereon, said recording medium being divided, in the direction of its length, into n consecutively-numbered, successive regions (where n is an integer greater than one);
    information supply means for supplying successive units of information to be recorded on said medium including a first, second, third, etc. units of information, said information supply means requiring a first length of time to supply each unit of information, said information supply means including photoelectric scanning means for converting the document information into the digital signals, the digital signals representing one document page comprising one unit of information;
    buffer means for accumulating the digital signals supplied by said information supply means until a unit of information has been accumulated; and
    control unit means for transferring the accumulated unit of information from said buffer means to said recording medium, said control unit means requiring a second length of time to transfer each unit of information, the second length of time being extremely short compared to the first length of time;
    a method of recording the successive units of information onto the endless recording medium, said method comprising the step of recording, in each jth region, all $(k-1)n+j$ units of information, where j and k are positive integers.

* * * * *